United States Patent Office 3,523,160
Patented Aug. 4, 1970

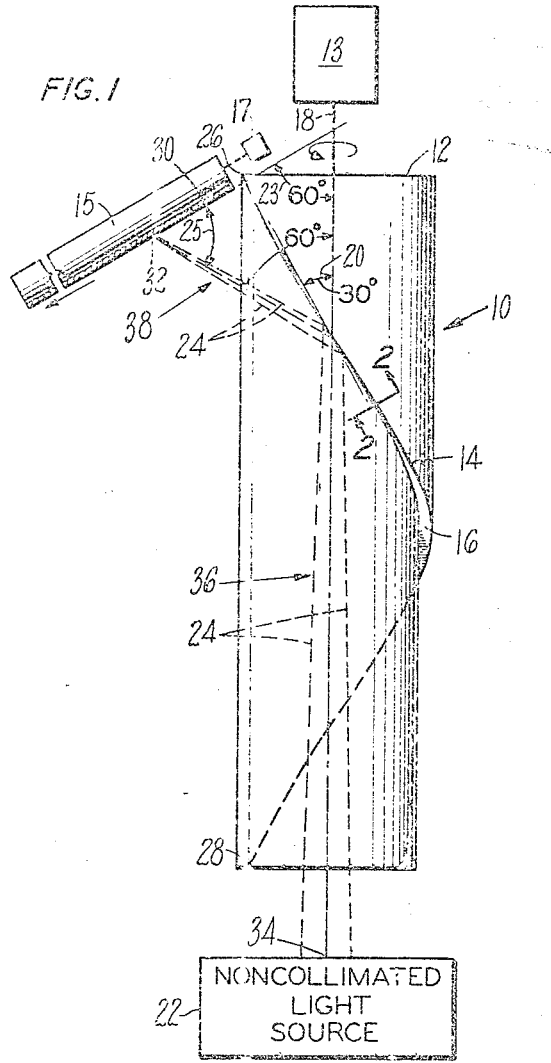
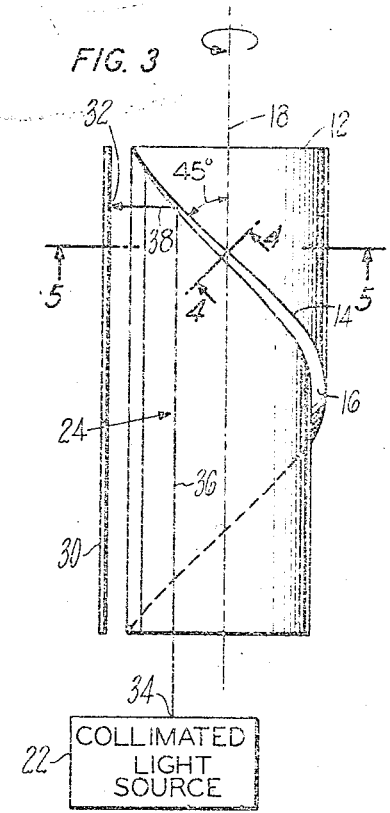
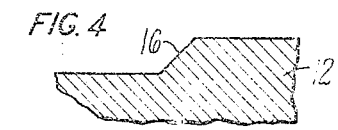
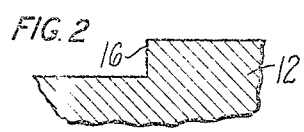
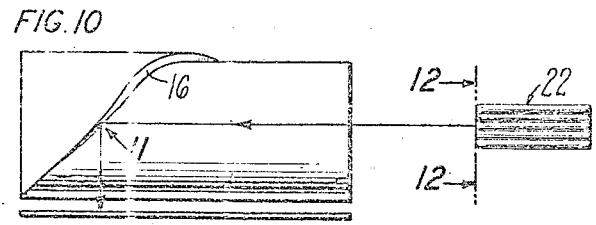
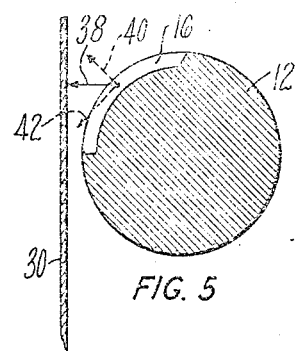

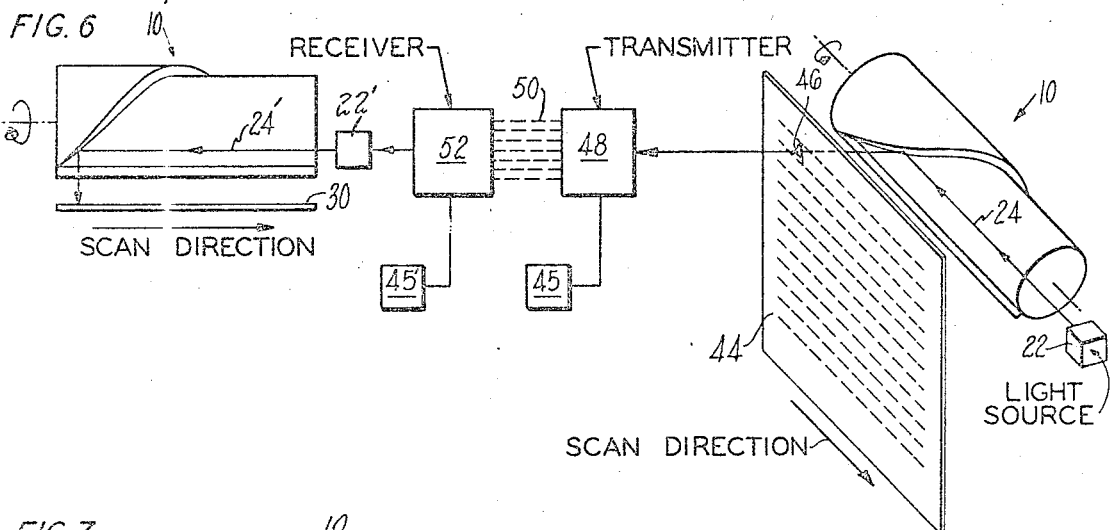
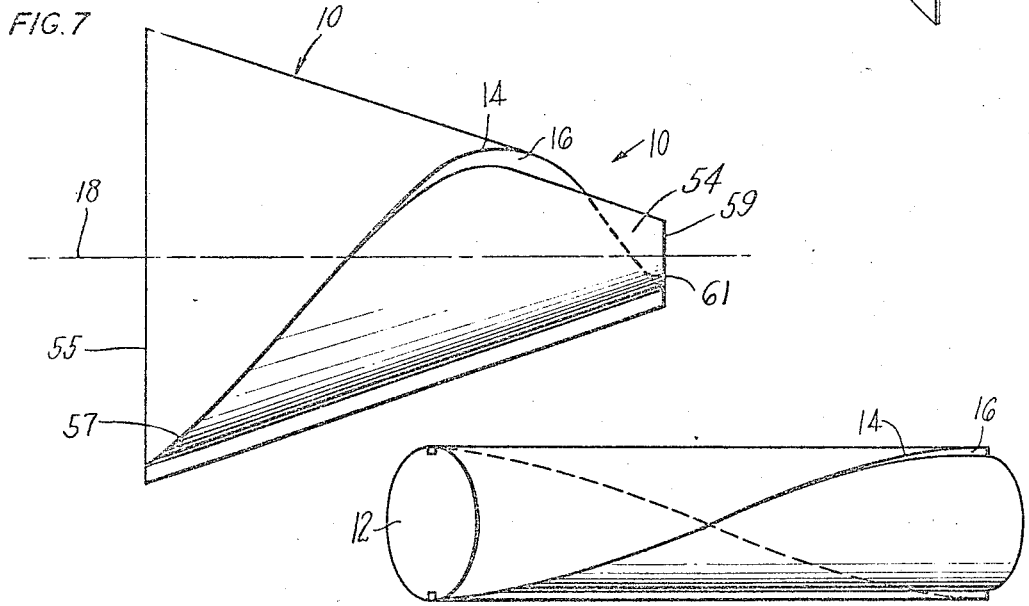
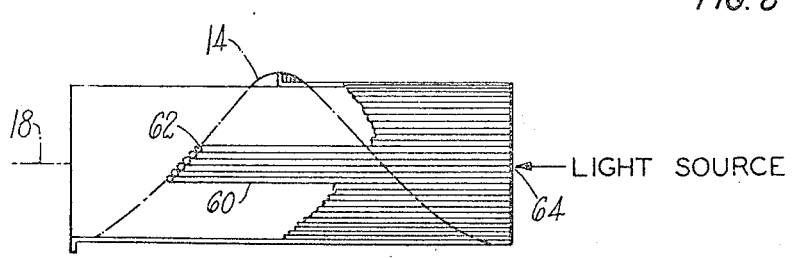

3,523,160
OPTICAL SCANNING DEVICE HAVING A
CONSTANT OPTICAL PATH LENGTH
Roland Willey, Bristol, Conn., assignor to United Aircraft Corporation, East Hartford, Conn., a corporation of Delaware
Filed Aug. 3, 1967, Ser. No. 658,244
Int. Cl. H04n 3/08
U.S. Cl. 178—7.6    10 Claims

ABSTRACT OF THE DISCLOSURE

A continuous substantially flat reflecting surface is formed by a helical mirror surrounding a cylindrical drum. An optical beam modulated with information is reflected from the mirror surface and scanned across a target as the helix turns.

BACKGROUND OF THE INVENTION

Field of invention

This invention relates to a scanning device suitable for either the transmitting or receiving end of a data display system and more particularly to an optical scanner utilizing a modulated optical beam.

Description of the prior art

In general, the optical scanning devices of the prior art depend upon a rotating pyramidal or polygonal mirror (mechanical flying spots scanners) comprising individual reflecting surfaces to scan an optical beam across a target. As these mirrors rotate, each mirror surface scans one line of information. One of the problems associated with scanning devices of this type is the variation in the velocity of the optical beam as it traverses the target, i.e., these mirrors usually rotate at a constant rate and the length of target trace for each degree of rotation varies across the surface of the target. Each reflecting mirror surface imparts a higher velocity to the optical beam at the beginning and end of the scan line than it does at the center of the line. The varying velocity of the scanning optical beam necessitates the use of additional complex circuitry to compensate for this undesirable characteristic. One expensive method of remedying this situation is to curve the surface of the target.

Scanning with a multiplicity of mirror surfaces creates horizontal jitter. That is, because a separate mirror surface is employed to scan each individual line, any imperfection in a particular mirror creates a horizontal displacement of the optical beam along the scan path. A different mirror surface used to scan the next line may not have the same imperfection and, therefore, a specific bit of information on this subsequent line will be slightly displaced horizontally from the information above it on the preceding scan line. Also, as the beam scans across the target, the angle of reflection from the mirror varies causing a variation in the cross-sectional area of the optical spot. This is especially undesirable with a source of noncollimated light (e.g., an optical beam narrowing to a focal point).

Other scanning devices of the prior art depend on mechanically operated pens to scan a moving target and record information by either writing with ink or burning the medium. This type of mechanical apparatus imposes the restriction of physical contact between the pen and the target, and subjects the pen to wear and periodic replacement. Spacing between the pen and the target is very critical and must be maintained in order to obtain the proper weight of line or burning effect. Some of these devices employ two recording pens, one pen to record a line of information, and a second pen positioned to begin the recording of the subsequent line, thereby eliminating the time it takes to return the first pen to the opposite side of the target before the start of the next line.

In all of the above-mentioned prior devices, distortion and nonlinearity have objectional effects on the data displayed and the use of a noncollimated light source causes variations in the optical spot size.

SUMMARY OF INVENTION

An object of the invention is to provide an optical scanning device that has a distortionless scan of high resolution at a constant velocity and is adaptable for use in either the receiving or transmitting portion of a data display system.

In accordance with the present invention, a scanning device is provided wherein a helical mirror forms a single substantially flat and continuous reflecting surface. An optical beam is reflected from the surface of the mirror and makes one complete scan of a target for every revolution of the helix.

In one embodiment of the invention, the helix is formed around a cylindrical drum and the mirror surface is maintained perpendicular to the surface of the drum. As the drum turns, a noncollimated optical beam, projected along the drum axis, is reflected from the mirror surface and scanned across a target. By maintaining the angle formed by the target and the drum axis equal to the angle formed by the target and the reflected optical beam, the optical path length from the light source to the target can be held constant as the beam scans across the target. Therefore, the noncollimated optical beam can be focused directly on the target surface by conveniently adjusting the position of the light source.

The invention accordingly provides a high-speed, high-resolution scanning device that scans across a target at a constant velocity with an optical beam of fixed path length and cross-sectional area.

The foregoing and other objects, features and advantages of the present invention will become more apparent in the light of the following detailed description of preferred embodiments thereof as illustrated in the accompanying drawings.

BRIEF DESCRIPTION OF THE DRAWINGS

FIG. 1 is a top view of a preferred embodiment of the invention and shows a noncollimated optical beam as the light source.

FIG. 2 is a sectional view of the invention taken along line 2—2 in FIG. 1, showing the mirror surface of the helical mirror.

FIG. 3 is a top view of an alternate embodiment of the scanning device employing a collimated optical beam as the light source.

FIG. 4 is a sectional view of the scanning device taken along line 4—4 in FIG. 3.

FIG. 5 is a sectional side view of the invention taken along line 5—5 in FIG. 3.

FIG. 6 is an illustration showing the scanning device utilized at the receiving and transmitting end of a data transmisison system.

FIG. 7 is a view of an alternate embodiment showing the helical mirror surface following the contour of a cone.

FIG. 8 is a perspective view of an alternate embodiment illustrating two helical mirror surfaces formed around a cylinder.

FIG. 9 is a partially broken-away view of a different embodiment of the scanning device having strands of optical fibers as the light-transporting medium.

FIG. 10 is a top view of the scanning device utilized in the transmitting end of a data display system.

FIG. 11 is an enlarged view of a portion of the mirror surface.

FIG. 12 is a sectional side view taken along line 12—12 in FIG. 10, showing a bundle of individual lasers as the light source.

DESCRIPTION OF THE PREFERRED EMBODIMENT

Referring generally to the embodiment of FIG. 1, an optical scanner 10, comprises a cylindrical drum 12 that has its surface cut in the contour of a helix 14. The helix 14 has a polished reflecting surface 16 that is perpendicular to the central axis 18 of drum 12 (see FIG. 2 for a sectional view) and forms a substantially flat mirror surface for the length of the drum. Drum 12 is rotated by a conventional motor 13. The length and diameter of the helix 14 depend upon the width of the scan line desired, the angle 20 that the helix 14 makes with the axis 18 of the drum, and the number of scans desired for each revolution of the drum. In the embodiment of FIG. 1, this angle is 30° but can be any convenient arrangement that provides a fixed optical path length (hereinafter described in detail).

Light source 22 is noncollimated and forms an optical beam 24 consisting of an incident beam 36 and a reflected beam 38. The incident beam 36 is directed parallel to the axis 18 of the drum 12 to impinge upon the mirror surface 16 at an angle of 30°. The reflected beam 38 is also reflected from mirror surface 16 at an angle of 30° and strikes a target 30 positioned at the focal point 32 of the optical beam 24. Every revolution of the helix 14 causes the optical beam 24 to traverse the mirror surface 16 from end 26 to end 28, and, therefore, optical beam 24 makes one complete scan across the target 30 for every revolution of drum 12. Target 30 can be moved vertically by any conventional means, such as a roller 15 driven by a motor 17. The length of the optical path between the focal point 32 and the light emanation point 34 is chosen to position the focal point 32 of the optical beam 24 on the surface of the target. One of the advantages of the invention is that the noncollimated light source 22 can be easily moved to any position that will focus the optical beam 24 at the optical beam's focal point 32.

In order to maintain the optical beam 24 focused on the target as the optical beam is scanned from one side of the target to the other, it is necessary to maintain the optical path length between points 32 and 34 at a fixed value. In the embodiment of FIG. 1, this is accomplished by maintaining the angle between the target 30 and the reflected optical beam 38, equal to the angle between the target 30 and the drum axis 18. That is, by keeping these angles equal (shown in FIG. 1 as reference numerals 23 and 25) an isosceles triangle relationship is formed by the drum axis 18, target 30 and the reflected optical beam 38. The 60° equality of angles 23 and 25, illustrated in FIG. 1, is only one of many values that can be used. By maintaining this equal-angle relationship, the optical path length between the target 30 and the noncollimated light source 22 remains the same for the entire scan across the target 30. The minimum size of the triangle is limited by the size of the target, and the minimum angles occur when the drum length is equal to one half the length of the target.

A perfectly collimated light source, such as a perfect laser beam, eliminates the focusing problem and permits target 30 to be placed at any desired distance from the drum 12 and at practically any angle with the reflected optical beam 38.

The continuous, substantially flat (flat in relation to the size of incident beam 36) reflecting surface just described in conjunction with FIGS. 1 and 2, offers the advantage of a jitterless scan with little distortion as the optical beam scans across the target. Minor imperfections that may be present in the mirror surface 16 do not have an appreciable deleterious effect on the quality of the image, i.e., scanning with a single mirror surface eliminates the jitter that results from scanning with a multiplicity of mirror surfaces that are not properly aligned.

In the embodiment illustrated in FIGS. 3, 4 and 5, helix 14 forms an angle of 45° with the drum axis 18. The mirror surface 16 of the helix 14 is slanted at an angle of 45° with the surface of the drum 12 (see FIG. 4). Obviously, these angles are not to be limited to 45°, rather, their values are determined by limitations of drum size and light source position. The light source 22 is collimated, enabling the target 30 to be placed in close proximity to drum 12 and mirror surface 16 without the troublesome focusing problems associated with the noncollimated light source described hereinbefore.

FIG. 5 is a sectional side view taken along line 5—5 in FIG. 3 and illustrates the reflected optical beam 38 as comprising the vector sum of optical vectors 40 and 42. Vector 40 represents the reflection of the beam 24 created by the 45° angle of the mirror surface 16 with the surface of the drum. Vector 42 represents the reflection of the light beam 24 due to the 45° angle made by the helix 14 with the drum axis 18. Target 30 can be positioned parallel with the drum axis 18 or it can be placed at an angle therewith. When a collimated light beam is utilized as the light source, or a zoom lens is used, it is immaterial that the optical path length between points 32 and 34 varies, because the cross-sectional area of the beam is held constant throughout the length of the beam.

In the embodiment of FIG. 6, the scanning device 10 is utilized in a data display system for transmitting and receiving graphic information. At the transmitting end of the system, light source 22 is considered to be a collimated source such as a laser beam and is caused to scan a transparent original 44 containing graphic information 46. The scanning device 10 is the same as discussed hereinbefore in conjunction with FIGS. 1–5. As the laser beam 24 scans the graphics on the original 44, it is modulated in accordance therewith. The information modulated laser beam 24 is converted into radio waves by a transmitter 48 well known in the art. The transmitted signal 50 is received by a receiver 52, also of conventional design, that converts the radio waves 50 into a varying electrical signal that modulates another light source 22' at the receiving end of the system. The received modulated laser beam 24' is directed at another scanning device 10' where the laser beam is scanned across a target 30.

Scanning devices 10 and 10' are maintained in synchronization by circuits 45 and 45' (see FIG. 6) well known in the art, so that the scanning of the transparent original 44 is synchronized with the scanning of the target 30.

Examples of suitable target materials are photosensitive paper and facsimile recording paper that will burn when struck by a laser beam of sufficient intensity.

FIG. 7 is an illustration of an alternate embodiment of the scanning device 10 wherein the helix 14 is formed around a conical frame 54. As discussed hereinbefore, the helical minor approaches a flat surface relative to the beam size. That is, increasing the area of the reflective surface in the path of an optical beam of fixed diameter has the effect of flattening the reflective surface. When utilizing the scanning device 10, illustrated in FIG. 7, with a noncollimated focused optical beam, the portion of the helix 14 in the vicinity of the base 55 of the cone 54 has a small reflective surface 57 that corresponds to a large beam diameter. The portion of the helix 14 in the vicinity of the narrow end 59 of the cone 54 has a larger reflective surface 61 corresponding to a larger beam diameter. This assumes that the focal point of the optical beam is close to the axis 18 of the cone 54. Therefore, the conical shape of helix 14 aids in maintaining the relation of mirror flatness to beam diameter constant as the optical beam scans the length of mirror surface 16.

In the alternate embodiment of FIG. 8, two helices 14 are formed on one drum 12. Each mirror surface 16 traverses the length of the drum 12 and extends half way around the drum circumference. By employing two helices on the same drum, it is possible to scan two lines of information at the same drum speed required for scanning one line of information in the embodiment of FIGS. 1 and 3. With a proper choice of drum diameter and length, several mirror surfaces can be spaced along the drum thereby greatly increasing the speed of transmission.

In the embodiment of FIG. 9, the helix 14 is formed of optical fibers 60, placed axially along the surface of the drum with one fiber end 62 making an angle with the drum surface. As the drum turns, light entering through the fibers opposite ends 64 is reflected through the optical fibers 60 and exits from end 62 at an angle to the drum axis 18.

FIGS. 10, 11 and 12 illustrate an embodiment wherein the light source 22 comprises a bundle of individual lasers 70, any combination of which can be triggered simultaneously. By triggering specific laser beams, an alphanumerical symbol can be projected onto the mirror surface 16, e.g., the letter T illustrated in FIG. 11. This technique provides a very rapid method for transmitting alphanumerical information.

An infinite number of patterns can be scanned onto a target by employing the apparatus and teaching of this invention. For example, by moving the light source and varying the shape of the helix, it is possible to use the device as an XY plotter.

Although the invention has been shown and described with respect to preferred embodiments thereof, it should be understood by those skilled in the art that the foregoing and other changes and omissions in the form and detail thereof may be made therein without departing from the spirit and scope of the invention, which is to be limited and defined only as set forth in the following claims.

Having thus described typical embodiments of the invention, that which is claimed as new and to be secured by Letters Patent of the United States is:

1. A data display system which comprises:
a light source for generating a beam of light,
a target for receiving said light beam,
scanning means comprising a mirror surface having the shape of a helix positioned between said light source and said target and adapted to rotate about a central axis to scan said light beam over said target as said scanning means rotates,
and means for directing said light beam onto said mirror surface whereby said beam is reflected at an angle therefrom toward said target, said target forming an acute angle with said central axis that is equal to the angle formed between said target and said reflected beam, the path length of said light beam between said target and said light source remaining fixed in length as said reflected beam scans said target.

2. The data display system of claim 1 wherein: said helix forms an angle of 30° with said central axis, and said reflected beam forms an angle of 60° with said central axis.

3. The data display system of claim 2 wherein said target includes a surface which forms an angle of 60° with said central axis and with said reflected beam.

4. The data display system of claim 1 wherein said mirror surface is flat and perpendicular to said central axis.

5. The data display system of claim 1 wherein said helix forms the contour of a cone.

6. The data display system of claim 1 wherein said mirror surface makes an acute angle with said central axis.

7. The data display system of claim 1 wherein said light beam source comprises a laser.

8. The data display system of claim 1 wherein said mirror surface forms an angle of 45° with said central axis, and said helix forms an angle of 45° with said central axis.

9. The data display system as in claim 1 wherein said target comprises a partially transparent sheet having information displayed thereon, said reflected beam being varied in intensity in response to said information as said light beam scans said target.

10. A data display system comprising:
a mirror surface having the shape of a helix and adapted to rotate about a central axis,
a light source comprising a two-dimensional array of individual laser elements, said laser elements being adapted to be actuated singly or in combination to generate a predetermined pattern of information, said array forming a beam of light which is directed onto said mirror surface and reflected at an angle therefrom,
and a target positioned in the path of said reflected beam, said target forming an acute angle with said central axis that is equal to the angle formed between said target and said reflected beam, said beam traversing the length of said mirror surface so that the reflected beam scans the said target as said mirror surface rotates about said central axis, the path length of said light beam between said target and said light source remaining fixed in length as said reflected beam scans said target.

References Cited

UNITED STATES PATENTS

| | | | |
|---|---|---|---|
| 2,021,889 | 11/1935 | Fahrney | 178—7.6 |
| 2,443,258 | 6/1948 | Lindenblad | 178—7.6 |
| 3,270,132 | 8/1966 | Richey | 178—7.5 |
| 3,360,659 | 12/1967 | Young. | |
| 3,389,218 | 6/1968 | Balamuth et al. | 178—6.6 |
| 2,072,528 | 3/1937 | Nicolson | 178—6 |

OTHER REFERENCES

IBM Technical Disclosure Bulletin, vol. 10, No. 2, July 1967.

Experimental Laser Display Bulletin, No. DLA 1324, January 1966.

RCA Technical Notes, No. 645, August 1965.

RICHARD MURRAY, Primary Examiner

D. E. STOUT, Assistant Examiner